No. 861,631. PATENTED JULY 30, 1907.
A. BENTON.
FERTILIZER OR SEED DISTRIBUTER.
APPLICATION FILED DEC. 8, 1906.
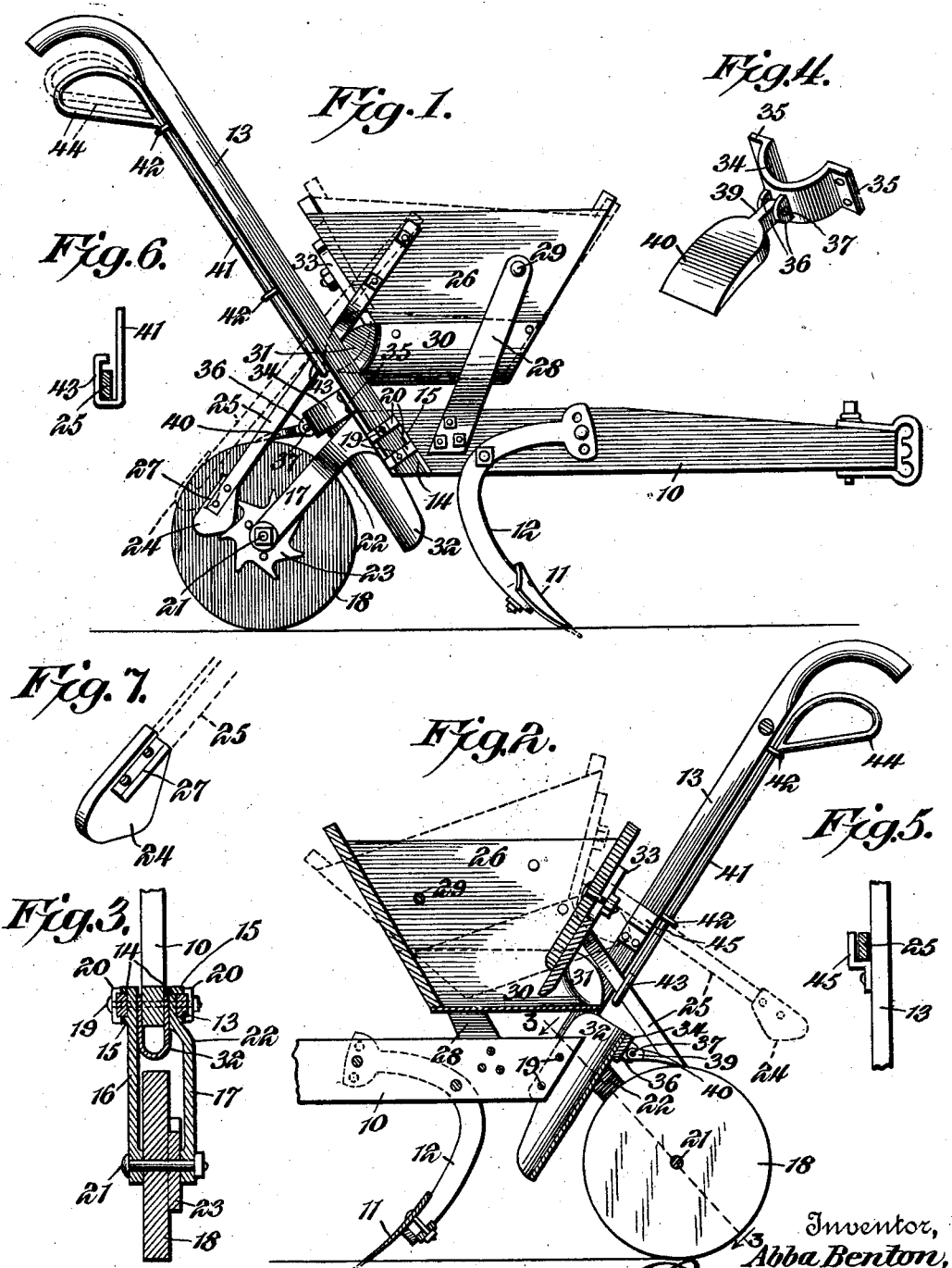

UNITED STATES PATENT OFFICE.

ABBA BENTON, OF MONTICELLO, GEORGIA, ASSIGNOR TO BENTON MANUFACTURING COMPANY, OF MONTICELLO, GEORGIA, A COPARTNERSHIP.

FERTILIZER OR SEED DISTRIBUTER.

No. 861,631.  Specification of Letters Patent.  Patented July 30, 1907.

Application filed December 8, 1906. Serial No. 346,899.

*To all whom it may concern:*

Be it known that I, ABBA BENTON, a citizen of the United States, residing at Monticello, in the county of Jasper and State of Georgia, have invented a new and useful Fertilizer or Seed Distributer, of which the following is a specification.

The invention relates to improvements in seed and fertilizer distributers.

The object of the present invention is to improve the construction of seed and fertilizer distributers, more especially that shown and described in Patent, No. 712,481, granted to me Nov. 4, 1902, and to enable the carrying wheel, which actuates the dropping mechanism to pack the loose earth on the fertilizer or seed to protect the same, and to prevent the fertilizer from being dried up by the sun, or washed away by the rain.

Another object of the invention is to enable the dropping mechanism to be instantly thrown out of operation to prevent the waste of seed and fertilizer at the ends of the rows, and when the distributer is traveling over stony ground.

It is also the object of the invention to provide means for preventing dirt and trash from accumulating either on the periphery, or on the side of the carrying wheel, at which the ratchet mechanism is located.

Furthermore the invention has for its object to so arrange the parts that they will mutually support and brace one another, and thereby increase the strength and durability of the distributer.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a distributer, constructed in accordance with this invention. Fig. 2 is a longitudinal sectional view of the same. Fig. 3 is a sectional view, taken substantially on the line 3—3 of Fig. 2. Fig. 4 is a detail perspective view of the scraper and its supporting bracket. Fig. 5 is a detail sectional view, illustrating the construction for supporting the actuating arm or member out of engagement with the ratchet disk. Fig. 6 is a detail view of the lower end of the operating rod. Fig. 7 is a detail view of the head or block of the actuating arm.

Like numerals of reference designate corresponding parts in all the figures of the drawing.

The improved distributer, like that illustrated in the said patent, is adapted to be applied to an ordinary shovel plow, having a beam 10 and provided with a shovel or blade 11, secured to a standard 12 and adapted to open a furrow into which the seed or fertilizer is deposited. The plow is provided at the rear end of the beam 10 with wooden handles 13, secured at their lower ends to the opposite faces of the rear end of the beam, and fitted in grooves or channels 14 of extensions or enlargements 15 of arms 16 and 17, between which a carrying or drive wheel 18 is mounted. The extensions or enlargements of the upper ends of the arms 16 and 17 are arranged at an inclination, and are secured to the plow beam 10 by bolts 19, which also pierce the handles. The handles are clamped in the grooves or channels of the enlargements or extensions of the arms 16 and 17 by means of clip plates 20, extending across the outer faces of the lower ends of the handles and having inwardly projecting terminal portions, which are located at the side edges of the handles, as clearly illustrated in Fig. 3 of the drawing.

The arms 16 and 17, which extend downwardly and rearwardly from the plow beam at an inclination, have their lower ends enlarged and provided with bearing openings for the reception of an axle 21, on which the wheel 18 is mounted, and one of the arms is laterally off-set or bent at 22 adjacent to its upper attached end to increase the distance between it and the other arm to provide a space for a ratchet disk or member 23.

The ratchet disk or member is provided with a plurality of projecting teeth, adapted to engage a block or head 24 of an actuating member 25, which is vibrated by the ratchet disk or member for oscillating a receptacle 26. The receptacle is in the form of a hopper, and the actuating arm, which is arranged at an inclination, extends downwardly and rearwardly adjacent to the inner face of one of the handles 13, and the head or block is preferably in the form of a casting, and has a lower tapered portion for engaging the ratchet 23. The lower engaging portion of the block or head is oppositely tapered so as to permit the ratchet disk and the wheel to rotate in either direction. The block or head provides a weighted lower end for the actuating arm to increase the vibratory movement of the hopper, and the tapered lower engaging portion of such head or block will enable the wheel to rotate in either direction without becoming locked. The face of the block or head is provided with a groove 27 to receive the lower end of the actuating arm, which is riveted, or otherwise secured to the block or head.

The hopper, which is located above the rear portion of the beam 10, is pivotally mounted between a pair of upwardly extending standards 28, secured by bolts, or other suitable fastening devices at their lower ends to the side faces of the plow beam, and provided at their upper ends with perforations for the reception of a transverse pivot or pintle rod 29. The pivot or pintle rod passes through the sides of the hopper at the front portion thereof, and the upper end of the actuating arm is secured to the hopper at the rear portion thereof.

The bottom 30 of the hopper is curved in cross section, and is provided with a rearwardly extending portion 31, located at a discharge opening at the back of the hopper and adapted to direct the fertilizer or seed to a spout 32. The back of the hopper is provided with a regulating slide 33 for controlling the discharge of its contents.

The spout, which is arranged at an inclination, is approximately U-shaped in cross section, its sides being secured to the opposite faces of the rear end of the plow beam by the bolts 19. The sides of the spout 32 are interposed between the lower ends of the handles 13 and the plow beam, and the upper end of the spout, which is fitted on the rear end of the plow beam, is arranged within a substantially U-shaped bracket 34, consisting preferably of a casting and having out-turned terminals 35, bolted or otherwise secured to the rear edges of the handles 13.

The U-shaped bracket or support, which forms a yoke for supporting the upper end of the spout, is provided at its rear face with a pair of projecting ears 36, which are perforated for the reception of a pivot 37 for connecting a shank or reduced portion 39 of a scraper 40 to the bracket or support 34. The scraper, which is slightly curved, has a sharp rear edge, which rests upon the top of the wheel 18, and which is adapted to remove trash and dirt therefrom. The block or head 24, which is provided with an inner flat face, is also adapted to operate as a scraper for removing dirt and trash from the side of the wheel on which the ratchet disk is mounted. The pivot 37 permits the scraper to be swung upward from the wheel on which the ratchet disk is mounted, and the said block or head is movable on the wheel from the outer periphery thereof to the ratchet disk.

The fertilizer or seed is dropped into the furrow opened by the blade or shovel 11, and the loose earth flowing over the blade or shovel covers the seed or fertilizer. The wheel by being located in rear of the spout is adapted to pack the loose earth on the seed or fertilizer, thereby aiding the former to germinate and preventing the latter from being washed away by the rain, or dried up by the sun.

In order to enable the dropping mechanism to be instantly thrown out of operation to prevent fertilizer or seed from being wasted, either at the end of a row, or when the distributer is traveling over stony ground or around stumps, or similar places, an operating rod 41 is slidably mounted on one of the handles 13 by means of staples or clips 42, or other suitable devices and is provided at its lower end with a hook 43. The hook 43, which is located beneath the actuating arm or member, is adapted to lift the same out of engagement with the ratchet 23, and it is preferably formed by bending the lower end of the rod to provide a lower supporting portion and an upwardly extending bill or portion, which is provided with an inwardly extending terminal spaced from the rod, as clearly illustrated in Fig. 6 of the drawing. The upper end of the operating rod is provided with a handle loop 44, having a curved upper portion, located adjacent to the grip portion of the adjacent handle 13, and adapted to be readily grasped by the operator without releasing the plow handles. The handle, on which the operating rod is slidably mounted, is also provided with a fixed support or bracket 45, adapted to receive the actuating arm or member 25 for holding the same out of engagement with the ratchet 23. The fixed support or bracket 45 consists of an angularly bent piece or casting, having an L-shaped supporting portion open at the top, as clearly illustrated in Fig. 5 of the drawing.

Having thus fully described my invention, what I claim as new and desire to secure by Letters Patent, is:—

1. In a distributer of the class described, the combination of a beam, dropping mechanism embodying a spout fitted on the rear end of the beam, handles provided with fastening means securing the spout to the beam, and a scraper having a bracket or support mounted on the handle bars and forming a yoke for the spout.

2. In a distributer of the class described, the combination of an agricultural implement having a wheel, dropping mechanism having a spout, a bracket forming a yoke for the spout, and a scraper pivoted to the bracket and engaging the wheel.

3. In a distributer of the class described, the combination of an agricultural implement having handles, dropping mechanism embodying a spout and a wheel, a support forming a yoke for the spout and a brace for the handles, and a scraper pivotally mounted on the support and engaging the wheel.

4. In a distributer of the class described, the combination with an agricultural implement having a wheel, of a vibratory receptacle provided with means for discharging seed or fertilizer, an actuating arm extending from the receptacle and having a fixed head provided with an oppositely tapering engaging portion, and a ratchet disk carried by the wheel for engaging the tapered portion of the head to vibrate the receptacle, said tapered portion being adapted to permit the ratchet disk and the wheel to rotate in either direction.

5. In a distributer of the class described, the combination with an agricultural implement having a wheel, of a ratchet mounted thereon, a vibratory receptacle, and an actuating arm extending from the receptacle and provided with a head arranged to be engaged by the ratchet, said head being movable from the ratchet to the periphery of the wheel and forming a scraper for removing dirt and trash from the contiguous side of the wheel.

6. In a distributer of the class described, the combination with an agricultural implement having a wheel, of a ratchet mounted thereon, a vibratory receptacle, and an actuating arm extending from the receptacle and provided with a head arranged to be engaged by the ratchet, said head having a tapered lower portion and provided with a flat inner face arranged contiguous to the wheel and forming a scraper for removing dirt and trash therefrom.

7. In a distributer of the class described, the combination of a beam, handles connected therewith, a wheel provided with a ratchet and connected with the beam, dropping mechanism embodying a vibratory receptacle, an actuating arm connected with the receptacle and operated by the ratchet, and a support rigidly mounted on one of the handles and arranged to receive the actuating arm for holding the same out of engagement with the ratchet.

8. In a distributer of the class described, the combination of a beam, handles connected therewith, a wheel provided with a ratchet and connected with the beam, dropping mechanism embodying a vibratory receptacle, an actuating arm connected with the receptacle and operated by the ratchet, and a fixed support mounted on one of the handles and open at the top to receive the actuating arm for holding the same out of engagement with the ratchet.

9. In a distributer of the class described, the combination of a beam, handles secured thereto, a wheel also connected with the beam and having a ratchet, a vibratory receptacle located above the beam and pivotally mounted at its front portion, said receptacle being provided at its rear portion with a discharge opening, an actuating arm extending rearwardly from the receptacle and operated by the ratchet, a fixed support mounted on one of the handles and having an L-shaped supporting portion arranged to receive the actuating arm, and an operating device movably mounted on such handles and provided with means for engaging the actuating arm.

In testimony, that I claim the foregoing as my own, I have hereto affixed my signature in the presence of two witnesses.

ABBA BENTON.

Witnesses:
C. T. EZELL,
A. Y. CLEMENT.